United States Patent [19]

Brennan

[11] Patent Number: 4,631,919
[45] Date of Patent: Dec. 30, 1986

[54] HYDRAULIC SYSTEM FOR VEHICLE AUXILIARY AXLE

[75] Inventor: George A. Brennan, La Habra Heights, Calif.

[73] Assignee: Challenge-Cook Bros., Incorporated, Industry, Calif.

[21] Appl. No.: 627,844

[22] Filed: Jul. 5, 1984

[51] Int. Cl.⁴ .......................... F15B 1/02; B62D 61/12
[52] U.S. Cl. ......................................... 60/413; 60/418; 280/405 R; 180/24.02
[58] Field of Search .................... 60/413, 414, 418; 280/405 R; 180/22, 24.02

[56] References Cited

U.S. PATENT DOCUMENTS

| 3,191,961 | 6/1905 | Brennan et al. | 280/405 R X |
| 3,587,233 | 6/1971 | Fischbach | 60/418 |
| 3,964,260 | 6/1976 | Williams et al. | 60/418 X |
| 4,084,833 | 4/1978 | Mohrbacker et al. | 180/24.02 X |
| 4,195,856 | 4/1980 | Larson et al. | 180/240.02 X |
| 4,539,814 | 9/1985 | McKie | 60/413 |

Primary Examiner—A. Michael Chambers
Assistant Examiner—John C. Fox
Attorney, Agent, or Firm—Lyon & Lyon

[57] ABSTRACT

A hydraulic system for a weight-load transferring mechanism for a vehicle in which a pivoted frame carries wheels and the hydraulic system raises and lowers those wheels. The system employs a directional control valve for switching the supply of pressurized hydraulic fluid from one side to the other of the operating cylinder and piston assembly without depressurizing the entire system and an accumulator is continually connected to the pressurized side for supplying the necessary fluid when switching from one mode of operation to another. The desired predetermined pressure in the system is maintained by a pressure switch operating a solenoid dump valve to allow continuous operation of the pump.

16 Claims, 5 Drawing Figures

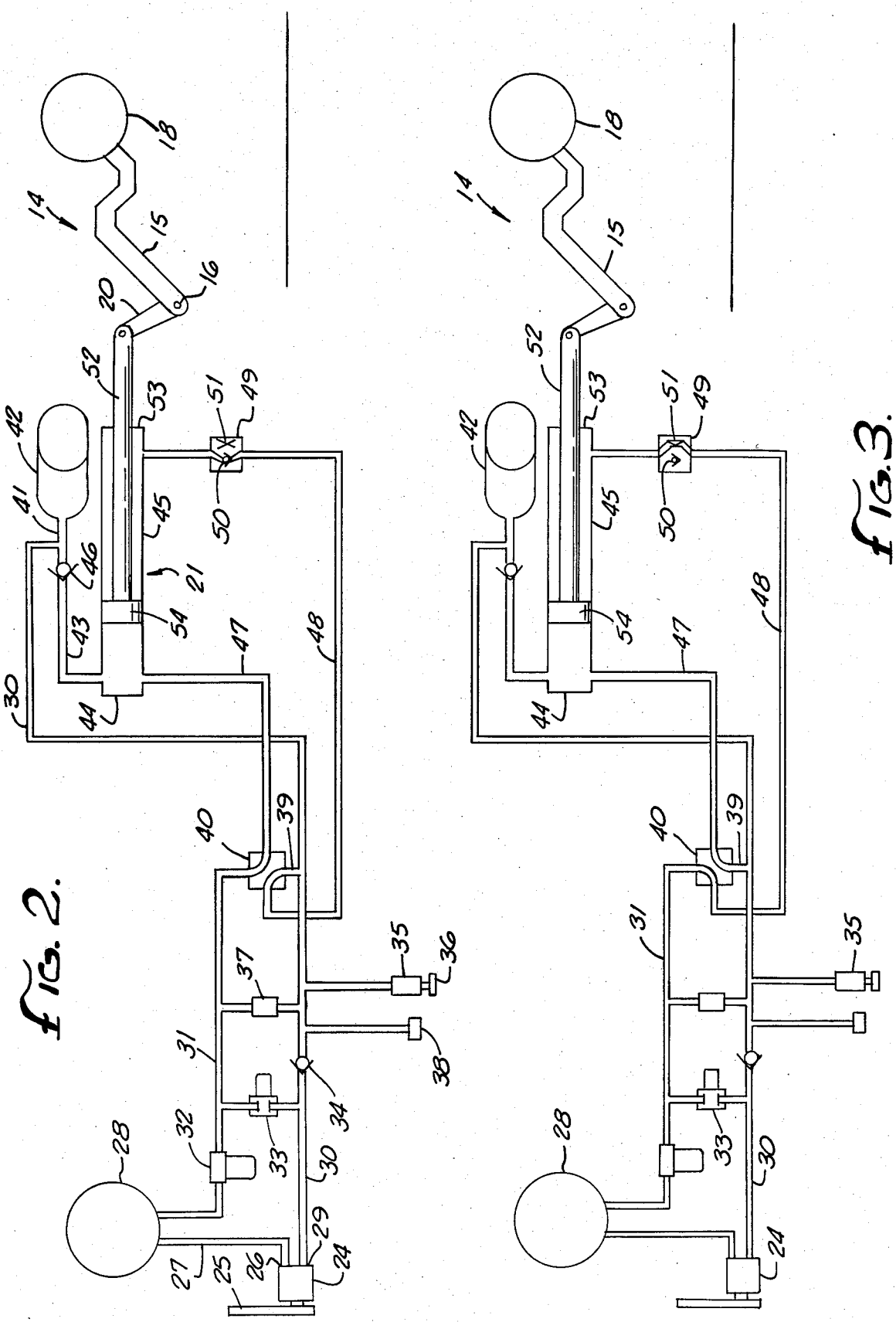

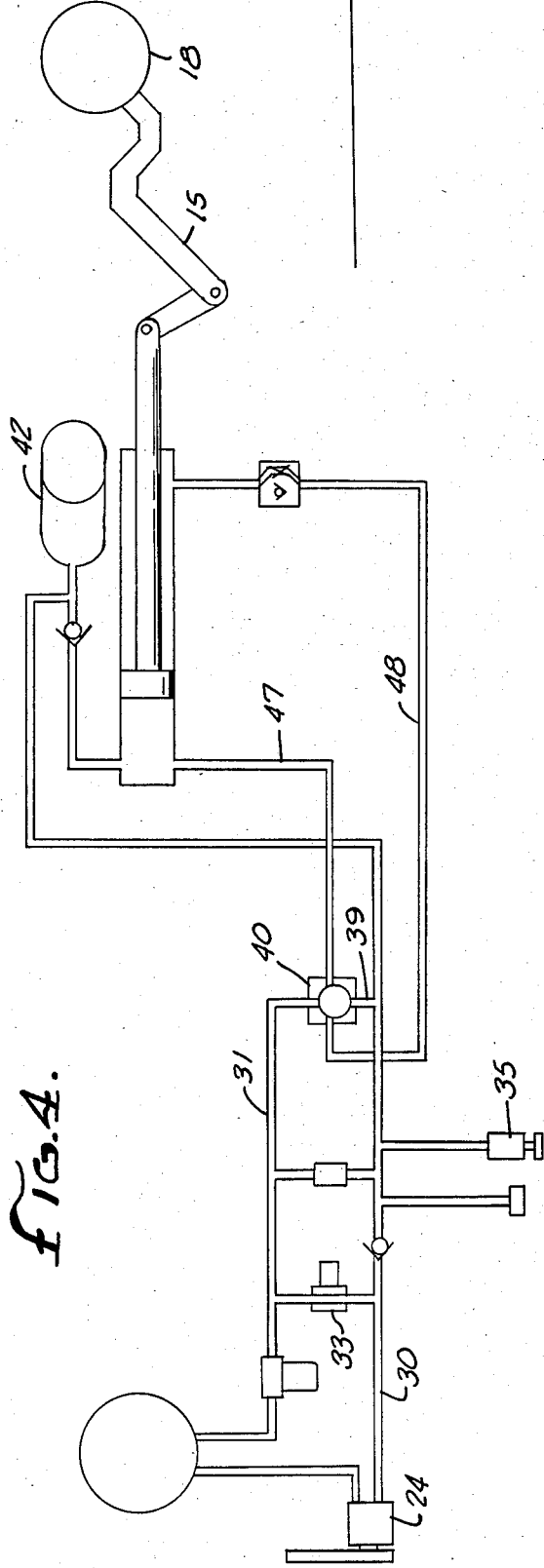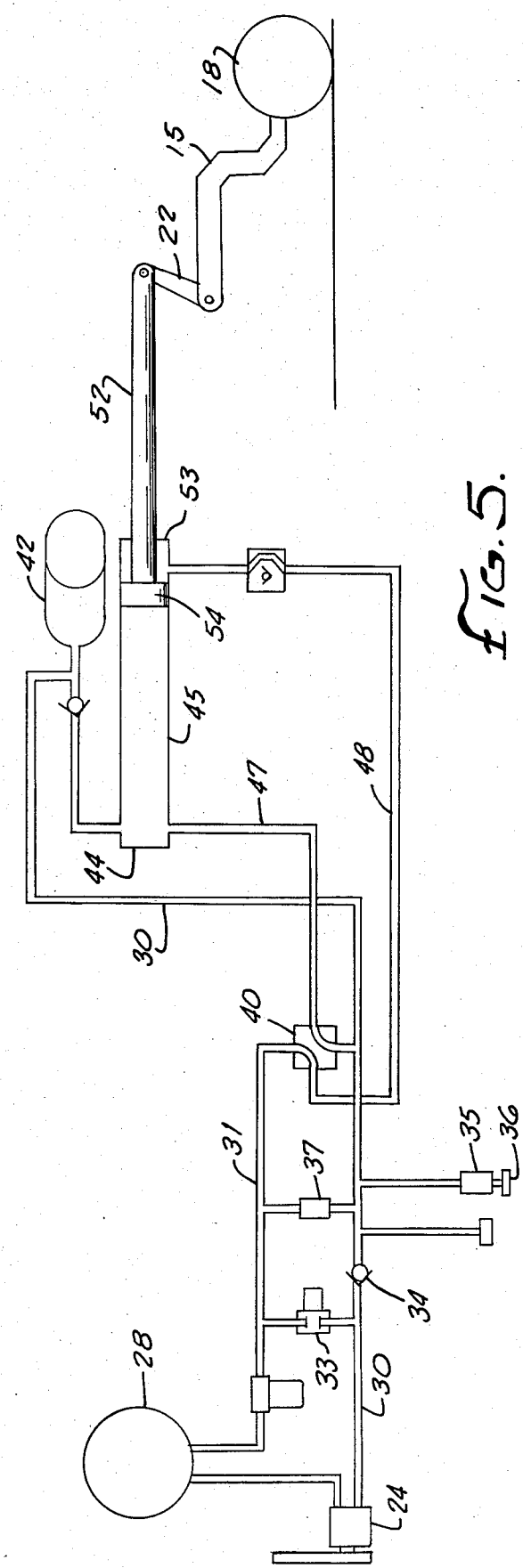

HYDRAULIC SYSTEM FOR VEHICLE AUXILIARY AXLE

This invention relates to a hydraulic system for operating an auxiliary axle on a vehicle for accomplishing weight-load transfer among the vehicle axles and, in particular, is directed to a highly efficient hydraulic system for the type of weight-load transferring auxiliary axle used on heavily loaded trucks such as concrete transit mixers.

There have been a number of auxiliary axle and wheel devices employed in the trucking industry for many years for allowing the truck vehicle to carry loads in excess of that which would be allowable without the auxiliary axle and wheel device. When the vehicle is not loaded, the auxiliary axle is raised for the wheels to clear the ground which generally improves the maneuverability of the unloaded vehicle. Various design criteria and highway regulations dictate the acceptable locations for the auxiliary axle and wheels, particularly, with respect to spacing from the normal axles and wheels. For example, the so-called "bridge formula" dictates the maximum load that can be imposed by vehicle wheels over a certain length between the front and rearmost wheels. Other requirements limit the maximum weight-load per axle. One of the more highly successful arrangements of an auxiliary axle and wheels on a vehicle has been the use of a trailing axle extending rearwardly on a pivoted frame from a concrete transit mixer truck whereby some of the excess load on the tandem rear axles caused by the load of concrete is supported by the trailing axle and wheels and transferred to the front axle and wheels as shown and described in U.S. Pat. No. 3,112,100 TRUCK-TRAILER TRANSIT MIXER. This permits the use of a larger concrete mixer drum and much higher pay load capacity than is possible with a single front axle and tandem rear axles under most highway regulations and many desirable design criteria.

Every auxiliary axle and wheel arrangement for transferring weight-load requires some mechanism for establishing and maintaining the desired weight-load on the auxiliary axle and wheels within a reasonable range while accommodating highway irregularities such as dips and humps. Pneumatic operated systems normally rely on the compression and expansion of the air-filled system, but the amount of movement is somewhat limited. Hydraulic systems have been found to be more practical for the auxiliary axle and wheel arrangements for concrete transit mixer vehicles of the type shown in the above-mentioned U.S. Pat. No. 3,112,100 and one such hydraulic system is shown in U.S. Pat. No. 3,191,961 HYDRAULIC POWER SYSTEM.

While the hydraulic system of U.S. Pat. No. 3,191,961 operates successfully to transfer the weight-load and to elevate and lower the auxiliary and wheels, that system and similar systems have been found to have certain undesirable inefficiencies and excessively costly components that are obviated by the present invention. For example, in a typical hydraulic system of U.S. Pat. No. 3,191,961 for operating the auxiliary axle and wheels of a concrete transit mixer truck it has been conventional to use a rather large hydraulic pump capable of producing 2.1 cubic inches per revolution in order to raise and lower the auxiliary axle within a reasonable length of time, whereas, the present invention permits the use of a pump of only about 28% of that volumetric capacity. Further, such a system of U.S. Pat. No. 3,191,961 required an expensive unloading valve of special construction and various other valves and components of larger sizes to handle the high levels of hydraulic fluid pumping, which is not required with the system of the present invention.

It is therefore a principle object of this invention to provide a more efficient and less costly hydraulic system for operating an auxiliary axle and wheels mechanism or transferring and distributing the weight-load to other axles and wheels of a vehicle.

It is a further object of this invention to provide a hydraulic system for an auxiliary axle and wheels device wherein an accumulator is pressurized with hydraulic fluid for accommodating the vertical movement of the auxiliary axle and wheels due to highway irregularities and such accumulator also is maintained in a pressurized condition during raising and lowering of the auxiliary axle and wheels to and from a storage position with the wheels out of ground contact whereby the pressurized hydraulic fluid in the accumulator may be used for such raising and lowering operation.

Other and more detailed objects and advantages of this invention will appear from the following description and the accompanying drawings wherein:

FIG. 2 is a diagrammatic view of the hydraulic system of this invention as used on the vehicle of FIG. 1 and illustrating the system in condition for raising the auxiliary axle and wheels.

FIG. 3 is a diagrammatic view similar to FIG. 2 but showing the hydraulic system operating to lower the trailing axle and wheels.

FIG. 4 is a diagrammatic view similar to FIGS. 2 and 3 but illustrating the hydraulic system positioned to maintain the auxiliary axle and wheels in a mid-way position between fully raised and fully lowered.

FIG. 5 is a diagrammatic view similar to FIGS. 2, 3 and 4 but illustrating the hydraulic system operating to apply the desired downward force on the auxiliary axle and wheels for on-highway operation.

Figure 1:
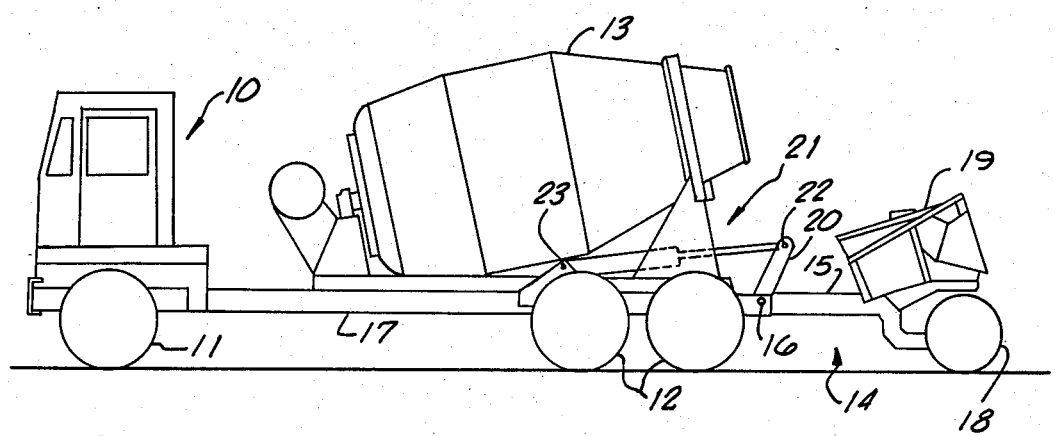
FIG. 1 is an elevation view of a typical concrete transit mixer truck with a trailing auxiliary axle and wheels in which the hydraulic system of this invention may be employed.

Referring now to the drawings, the present invention will be described in connection with its use on a concrete transit mixer truck and weight-load transferring mechanism of the type shown in U.S. Pat. No. 3,112,100, but it is to be understood and will readily appear to those skilled in the art that the invention can be used on various types of vehicles and different arrangements of the auxiliary axle and wheels. As shown in FIG. 1, the truck, generally designated 10, has a front axle and steerable wheels 11 and a rear tandem axle and wheels 12. A concrete mixer drum 13 is rotatably mounted on the truck 10 and may be of a capacity larger than otherwise possible for this three axle truck.

A weight-load transferring mechanism 14 is provided on the rear of the truck 10 and includes a frame 15 pivotally mounted at 16 to the truck frame 17. The trailing frame 15 has an auxiliary axle and wheels 18 which are preferably castored for pivoting about a vertical axis to properly track the motion of the truck 10 during turns, as described in U.S. Pat. No. 3,112,100. The trailing frame 15 may also support the loading hopper and discharge chute assembly 19 for the concrete mixer drum 13 which assembly is moved into position at the open end of the drum 13 by pivotally raising the frame 15. If desired, the loading hopper and discharge chute assembly 19 or either of them may be permanently supported in position at the open end of the mixer drum 13 rather than being mounted on trailing frame 15.

The trailing frame 15 is provided with a bell crank arm 20 extending upwardly from the pivot 16 and rigidly fixed to the frame 15. A hydraulic cylinder and piston assembly, generally designated 21, has its rod end pivotally connected at 22 to the extending end of the bell crank 20 and its piston end pivotally connected at 23 to a bracket on the truck frame 17. By hydraulically retracting the piston rod of the assembly 21, the trailing frame 15 is pivoted about point 16 to elevate the weight-load transfer mechanism 14 to any desired location. Conversely, by supplying hydraulic fluid to the cylinder of assembly 21 the piston rod is extended to lower the frame 15 to a position for the auxiliary wheels 18 to contact the ground. Further, by applying a predetermined ground contacting force on the wheels 18, the weight-load on the tandem wheels 12 is reduced and partially transferred to the front wheels 11. The ground contacting force on auxiliary wheels 18 must be maintained at approximately the same desired magnitude while the truck 10 proceeds down the highway over dips and humps which requires pivoting of the trailing frame 15 as the wheels 18 rise and fall to follow the highway surface, which is accomplished by the suspension system such as that described in U.S. Pat. No. 3,191,961. As thus far described, the vehicle and weight-load transferring mechanism illustrated in FIG. 1 is essentially the same as that shown and described in U.S. Pat. No. 3,112,100. The present invention relates to a hydraulic suspension system for the weight-load transferring mechanism that is a substantial improvement over that of U.S. Pat. No. 3,191,961.

Referring now to FIG. 2, the components of the hydraulic system will be described and those components are the same for FIGS. 3, 4 and 5 which merely show different modes of operation of the hydraulic system. The aforementioned weight-load transferring mechanism 14 is diagrammatically shown in FIG. 2 with the auxiliary wheels 18, the frame 15, pivot 16, bell crank 20 and cylinder and piston assembly 21. The hydraulic system includes a pump 24 which may be driven in any convenient manner such as by an engine power take-off unit 25 on the truck 10. The intake 26 of pump 24 is connected through a conduit 27 to a reservoir 28. The output 29 of hydraulic pump 24 is connected to a main supply conduit 30 having numerous branch conduits connected to other components. A main return conduit 31 is connected through a conventional filter 32 to the reservoir 28.

A solenoid operated dump valve 33 is positioned in a branch conduit between supply conduit 30 in direct communication with the pump outlet 29 and the return conduit 31, preferably upstream of the filter 32. Downstream in supply conduit 30 from the location of dump valve 33 there is provided a check valve 34 for preventing reverse flow toward the pump 24. An adjustable pressure sensitive switch 35 is mounted on a branch conduit from supply conduit 30 downstream of check valve 34. Pressure switch 35 electrically controls the operation of solenoid dump valve 33 to open that valve at pressures above a preselected amount and to close that valve 33 at pressures sensed by switch 35 below that preselected amount. The preselected amount may be adjusted by the knob 36 on switch 35 by the operator to control the ground contacting force on auxiliary wheels 18 in relation to the load of concrete, all in a manner hereinafter described in more detail in connection with the operating mode of FIG. 5. A pressure relief valve 37 is connected in a branch conduit from supply conduit 30 downstream of check valve 34 to return conduit 31. Relief valve 37 is normally closed and only opens if the hydraulic pressure in supply line 30 downstream of check valve 34 exceeds a predetermined amount whereby that pressure is reduced to the predetermined amount. A pressure gauge 38 may be provided in supply conduit 30 downstream of check valve 34 to allow visual monitoring of the actual pressure in that portion of the system.

The supply conduit 30 has a branch conduit 39 connected to a multi-position directional control valve 40. Lastly, the supply conduit 30 also is connected to an inlet conduit 41 leading to an accumulator 42. The accumulator 42 is of a conventional type with a bladder that is pressurized with gas to maintain a relatively constant hydraulic pressure whenever supply conduit 30 is pressurized and to accommodate changes in volume in the hydraulic system by receiving, storing and discharging the hydraulic fluid. A conduit 43 is connected from the accumulator 42 to the piston end 44 of the cylinder 45 of the aforementioned cylinder and piston assembly 21. A check valve 46 in line 43 between the cylinder and the connection of supply conduit 30 allows hydraulic fluid to flow from the cylinder 45 to the accumulator 42 but prevents reverse flow.

The directional control valve 40 has connected to it, in addition to branch conduit 39 from supply conduit 30, the return conduit 31 leading to the reservoir 28, a conduit 47 from the piston end 44 of the cylinder 45 and a conduit 48 from the rod end of the cylinder 45 whereby through appropriate positioning of control valve 40 the hydraulic fluid may be conducted to and from the desired component of the hydraulic system. Conduit 48 is provided with a flow control valve 49 which includes a check valve 50 and a restricted bypass 51 whereby free flow of hydraulic fluid is permitted from the directional control valve 40 to the cylinder 45 but only restricted flow in the reverse direction is permitted.

The operation of the hydraulic system to perform the desired movements and functions of the weight-load transferring mechanism 14 will now be described. It should be noted that pump 24 operates continuously while the hydraulic system is functioning rather than cycling on and off to accomplish certain functions. FIG. 2 illustrates the hydraulic system components and specifically directional control valve 40 in the position during raising of the wheels 18 by retracting the piston rod 52. The operator manipulates the directional control valve 40 to the appropriate position for the raising function whereby hydraulic fluid is supplied from pump 24 through supply conduit 30 and branch conduit 39 to directional control valve 40 and then through conduit 48 and flow control valve 49 to the rod end 53 of the cylinder 45 to retract the rod 52. The flow through the flow control valve 49 is unrestricted in this direction and therefore the raising of the wheels 18 may be as rapid as desired, depending on the volumetric output of the pump 24 and the relative sizes of the rod 52 and cylinder 45. Moreover, the piston end 44 of cylinder 45 is connected through conduit 47 and directional control valve 40 to return line 31 and reservoir 28 to eliminate any restriction to the movement of the piston 54. Specifically, it has been found that a sufficiently rapid raising of the wheels 18 may be accomplished by a rather small hydraulic pump 24 of a capacity of only 0.61 cubic inch per revolution as compared to the hydraulic pump required by the prior art system of U.S. Pat. No. 3,191,961 which had a capacity of 2.1 cubic inches per revolution, i.e. about 3.5 times that of the present invention.

During the raising of the wheels 18 as shown in FIG. 2 and as thus far described, the pressure in supply conduit 30 as sensed by pressure switch 35 is relatively low and therefore pressure switch 35 does not cause solenoid dump valve 33 to open. Also, relief valve 37 remains closed. When the trailing frame 15 has been pivoted the maximum amount for raising wheels 18 whereby piston 54 can no longer move within cylinder 45, the pressure in supply line 30 will increase until the predetermined level is sensed by pressure switch 35 which then operates dump valve 33 to an open position to cause the output of pump 24 to pass directly from supply conduit 30 to return conduit 31 and then to the reservoir 28. It is preferred that solenoid dump valve 33 be of a normally open type and therefore the switch 35 deenergizes the solenoid of dump valve 33 to cause the valve to open and switch 35 energizes the solenoid to close the valve. With the wheels 18 completely raised the pressure in supply conduit 30 downstream of check valve 34 remains at the high predetermined level sensed by pressure switch 35 whereby maintaining the wheels 18 in the raised position and pressurizing the accumulator 42. If there is any drop in that pressure over a period of time, such as by leakage through check valves 34 and 46 or past piston 54, the pressure switch 35 will again cause dump valve 33 to close whereby pressurized fluid will be supplied from pump 24 through conduit 30 and check valve 34 to bring the system up to the desired pressure level and therefore the wheels 18 will not inadvertently start to lower.

Referring now to FIG. 3, the hydraulic system and particularly directional control valve 40 are illustrated in the condition during lowering of the weight-load transferring mechanism 14. Directional control valve 40 has been manipulated to a position whereby conduit 48 from the rod end 53 of the cylinder 45 is connected to the return line 31 leading to the reservoir 28 whereby the pressure in the rod end of cylinder 45 drops to a lower level. The flow control valve 49 in line 48 restricts the rate of flow of fluid therethrough since the check valve 50 is closed and the fluid can only flow through the restricted bypass 51. This controls the rate of descent of the frame 15 and wheels 18 to a moderate speed to avoid damage to any components of the system or injury to persons or property located beneath the wheels 18 as they descend. Meanwhile, the pump 24 continues to supply hydraulic fluid under pressure through supply conduit 30 to accumulator 42 and through branch conduit 39, directional control valve 40 and conduit 47 to the piston end 44 of the cylinder 45 urging the piston 54 and piston rod 52 in the direction to cause lowering of the wheels. During this lowering movement, the pressure in supply conduit 30 is at a moderate level and not in excess of the setting of pressure switch 35 whereby dump valve 33 is closed to assure the entire supply of hydraulic fluid from pump 24 is being provided to the piston end 44 of the cylinder 45 and the accumulator 42.

Referring now to FIG. 4, the directional control valve 40 has been manipulated to a position whereby all four of the conduits 31, 39, 47 and 48 connected thereto are closed and isolated from each other whereby the system is hydraulically locked in that position. This may be desirable for positioning the frame 15 in an intermediate position where the wheels 18 are above the ground but not fully elevated to a position near the open end of the concrete mixer drum 13. This intermediate position has been found desirable in connection with concrete batch plants having hoods and similar devices that surround the open end of the mixing drum 13 while it is being charged with materials, which hoods and other dust collecting equipment such as exhaust fans are often required for air pollution reasons. It should be noted that even in this intermediate holding position that the pump 24 continues to operate with the pressure switch 35 sensing the predetermined level in supply conduit 30 thereby energizing dump valve 33 to an open position and yet maintaining a full pressurized volume of fluid in the accumulator 42.

Referring now to FIG. 5, the hydraulic system is illustrated in the position with the frame 15 pivoted to its lower most position and the wheels 18 in contact with the ground. The directional control valve 40 is in the same position as shown in FIG. 3 during the lowering of the wheels and in fact is merely a continuation of the lowering to a pressurized weight-load transferring condition. As described with respect to FIG. 3, the pump 24 supplies fluid to the piston end 44 of the cylinder 45 to pressurize the cylinder and apply force through the piston rod 52, bell crank 22, and frame 15 to the wheels 18. The rod end 53 of the cylinder 45 is connected through conduit 48, directional control valve 40 and return line 31 to the reservoir. When the pressurized supply conduit 30 downstream of check valve 34 reaches the predetermined pressure as set by knob 36 on the pressure sensitive switch 35, the downward force by wheels 18 on the ground is at the desired level to cause the weight-load transfer on the other wheels. The dump valve 33 is opened under these conditions. As the truck proceeds along a highway and the wheels 18 must move up and down to accommodate variations in the highway surface, several different conditions can occur. First, if the wheels 18 drop a substantial amount, the volume of pressurized hydraulic fluid in the accumulator 42 may not be adequate to continue to fill the cylinder 45 as the piston 54 moves toward the rod end 53 of the cylinder whereby the pressure in the system will drop below the predetermined level sensed by pressure switch 35 and therefore switch 35 will cause dump valve 33 to close and the pump 24 to supply additional fluid through check valve 34 to the cylinder 45 and accumulator 42. If the road conditions are such that the wheels 18 merely move up and down relatively small distances, then the accumulator 42 functions as a "spring" to accommodate the small changes in volume of cylinder 45 through conduit 47 and supply line 30. In the event the auxiliary wheels 18 encounter a substantial hump in the road forcing the wheels upwardly a substantial distance, the accumulator 42 will not have a sufficient volumetric capacity to accommodate the hydraulic fluid being forced from cylinder 45 at the desired pressure and therefore the pressure within the system will rise until the predetermined pressure setting of relief valve 37 is reached whereupon the excess fluid will be discharged to return conduit 31 and the reservoir 28. Thus, the full range of movements of wheels 18 are quickly and reliably accomplished by this hydraulic system.

The hydraulic system of this invention has numerous advantages over the best systems previously known, such as that of U.S. Pat. No. 3,191,961. As mentioned above, the system of the patent required a pump about 3.5 times the size of that required by the present invention. In the system of U.S. Pat. No. 3,191,961 the cylinder was pressurized on both ends for causing downward motion and force as a result of the different areas on the piston side and the rod side of the piston whereas the present invention only pressurizes the piston side whereby the size of the piston and cylinder are reduced. Further, in the prior system of U.S. Pat. No. 3,191,961 the pressurized fluid in the accumulator was always dumped to the reservoir during raising and then lowering whereas in the system of the present invention the accumulator 42 is maintained in a pressurized condition and not dumped to reservoir when the operating modes are changed. In this manner the volume of pressurized fluid in the accumulator is used to assist the pump 24 in supplying the fluid requirements to either side of the cylinder and piston for accomplishing the new mode of operation. For example, when the hydraulic system of the present invention completes the wheel raising cycle shown in FIG. 2, the accumulator 42 is fully pressurized and when the system is switched to the wheel lowering mode of FIG. 3, the pressurized fluid in accumulator 42 is supplied directly to the piston side of the cylinder to assist in supplying the volume of fluid necessary to lower the wheels. Similarly, when the system is switched from the on-highway operating mode of FIG. 5 to the wheel raising mode of FIG. 2, the pressurized fluid in accumulator 42 is supplied to the rod end of the cylinder assembly 21 to assist in meeting the required fluid for accomplishing the raising of the wheels and, in fact, the volume of pressurized fluid in accumulator 42 is almost enough to accomplish the wheel raising alone.

Further, in view of the smaller volumetric fluid requirements throughout the system, the conduits and components can all be smaller and less expensive than was possible with the system of U.S. Pat. No. 3,191,961. Further, the combination of the pressure switch 35 and solenoid dump valve 33, both of which are commercially available products, is much simpler and less expensive than the especially designed and manufactured unloading valve used in the prior system of U.S. Pat. No. 3,191,961.

While I have described my invention in connection with a specific embodiment thereof for operating a particular style of weight-load transferring mechanism, it will readily be understood by those skilled in the art that my invention is applicable to various styles of weight-load transferring mechanisms and that my system may be modified in various respects without departing from my invention as defined by the following claims.

What is claimed:

1. A hydraulic system for operating a weight-load transferring mechanism having wheels on a frame mounted on a vehicle to allow the wheels to be moved into and out of engagement with the ground, comprising, a cylinder and piston means having a rod connected to the piston, said cylinder and rod connected between the vehicle and frame for causing movement of the frame to raise or lower the wheels upon selectively pressurizing a first end and a second end of said cylinder, a hydraulic pump and conduit means comprising a pressurized supply side and a return side, an accumulator having means continually connected to both said supply side and to said first end of said cylinder, a conduit means having a dump valve means connected between said supply side and said return side, pressure sensitive means responsive to the pressure in said accumulator for opening said dump valve means above a predetermined pressure, a directional control valve means selectively operable for connecting said supply side to said second end of said cylinder for raising the frame and wheels and for connecting said supply side to said first end of said cylinder for lowering and applying weight-load transferring force to the frame and wheels, and conduit means continually connecting said supply side to said directional control valve means and said accumulator.

2. The hydraulic system of claim 1 wherein said pressure sensitive means is adjustable for causing opening of said dump valve means at different predetermined pressures for accomplishing different magnitudes of weight-load transfer.

3. The hydraulic system of claim 1 wherein said accumulator is connected through said directional control valve means to the pressurized first end of the cylinder during lowering of the frame and to the pressurized second end of the cylinder during raising of the frame upon said seclective operation of said directional control valve without connecting said accumulator to the return side at any time.

4. The hydraulic system of claim 1 wherein said directional control valve means connects the return side to the end of said cylinder that is not being pressurized for raising or lowering.

5. The hydraulic system of claim 1 wherein flow control means are provided between said second end of said cylinder and said return side for restricting the rate of hydraulic fluid flow therethrough to control the rate of lowering the frame and wheels.

6. The hydraulic system of claim 1 wherein said directional control valve means is selectively operable to a third position closing communication to both ends of said cylinder to maintain the frame in any given position.

7. The hydraulic system of claim 1 wherein means are provided connecting said accumulator to the said first end of said cylinder including means for allowing flow from said cylinder to said accumulator and preventing reverse flow.

8. The hydraulic system of claim 1 wherein means are provided in said supply side downstream from the connection of said dump valve means and upstream of the location of said pressure sensitive means for allowing flow in the downstream direction and preventing reverse flow.

9. The hydraulic system of claim 8 wherein said pressure sensitive means is adjustable for causing opening of said dump valve means at different predetermined pressures for accomplishing different magnitudes of weight-load transfer.

10. The hydraulic system of claim 8 wherein said accumulator is connected through said directional control valve means to the end of the cylinder that requires pressure for raising or lowering the frame upon said selective operation of said directional control valve without connecting said accumulator to the return side at any time.

11. The hydraulic system of claim 10 wherein said directional control valve means connects the return side to the end of said cylinder that is not being pressurized for raising or lowering.

12. The hydraulic system of claim 11 wherein flow control means are provided between said second end of said cylinder and said return side for restricting the rate of hydraulic fluid flow therethrough to control the rate of lowering the frame and wheels.

13. The hydraulic system of claim 12 wherein means are provided connecting said accumulator to the said first end of said cylinder including means for allowing flow from said cylinder to said accumulator and preventing reverse flow.

14. The hydraulic system of claim 13 wherein said pressure sensitive means is adjustable for causing opening of said dump valve means at different predetermined pressures for accomplishing different magnitudes of weight-load transfer.

15. A hydraulic system for operating a weight-load transferring auxiliary axle and wheel mechanism having a frame pivotally mounted on a vehicle to allow the auxiliary wheels to be moved into and out of engagement with the ground, comprising,
   (a) a cylinder and piston means having an extending rod connected to the piston, said cylinder and rod connected between the vehicle and frame for causing pivoting of the frame to lower the wheels upon extension of the rod by pressurizing the piston end of said cylinder and to raise the wheels upon retraction of said rod by pressurizing the rod end of said cylinder,
   (b) an accumulator having means continually connected to said piston end including a check valve means for preventing flow from said accumulator to said cylinder and allowing reverse flow,
   (c) a hydraulic pump with an intake and an output,
   (d) a reservoir connected to said pump intake,
   (e) a dump valve connected between said pump output and said reservoir and having solenoid means for opening and closing said dump valve,
   (f) a pressure sensitive switch means responsive to the pressure in said accumulator for operating said solenoid to open said dump valve above a predetermined pressure.
   (g) said switch means being adjustable for selecting said predetermined pressure,
   (h) conduit means continually connecting said pump output to said accumulator to pressurize same including check valve means for preventing reverse flow to said pump,
   (i) a pressure relief valve connected between said accumulator and said reservoir for establishing a maximum pressure level in said accumulator,
   (j) a directional control valve having means connected to said piston end of said cylinder, to said rod end of said cylinder, to said reservoir, and to said conduit means between said accumulator and said check valve means.
   (k) and said directional control valve being selectively operable (1) to connect said conduit means from said pump to said rod end for raising the frame and wheels, (2) to connect said conduit means from said pump to said piston end for lowering and applying weight-load transferring force to the frame and wheels, and (3) to close the means connected to said reservoir to prevent draining of either end of said cylinder for maintaining the frame and wheels in any desired position.

16. A hydraulic system for operating a weight-load transferring mechanism having wheels on a frame mounted on a vehicle to allow the wheels to be moved into and out of engagement with the ground, comprising, a cylinder having two ends and piston means having a rod connected to the piston, said cylinder and rod connected between the vehicle and frame for causing movement of the frame to selectively raise and lower the wheels upon pressurizing one of the two ends of said cylinder, means for providing a high pressure supply side and a low pressure return side for hydraulic fluid, an accumulator means continually connected to said high pressure side, a dump valve connected between said supply and return sides, pressure sensitive means responsive to the pressure in said accumulator for opening said dump valve above a predetermined pressure, means in said supply side for maintaining said predetermined pressure upon opening of said dump valve, and selectively operable control valve means continually connected to said supply side for selectively connecting said supply side to either end of said cylinder and connecting the other end to the return side for raising and lowering the frame and wheels.

* * * * *